Figure 1:
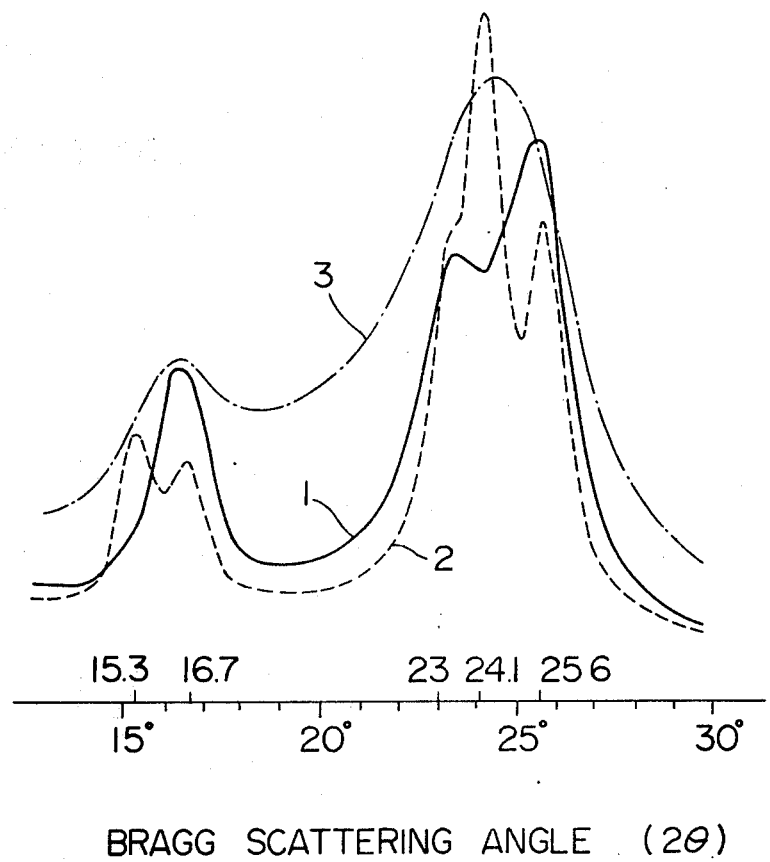

United States Patent [19]

Kuratsuji et al.

[11] 4,060,516
[45] Nov. 29, 1977

[54] NAPHTHALATE POLYESTER FILAMENTS

[75] Inventors: Takatoshi Kuratsuji; Shoji Kawase; Takeo Shima, all of Iwakuni, Japan

[73] Assignee: Teijin Limited, Osaka, Japan

[21] Appl. No.: 646,645

[22] Filed: Jan. 5, 1976

Related U.S. Application Data

[63] Continuation of Ser. No. 480,819, June 19, 1974, abandoned.

[30] Foreign Application Priority Data

June 19, 1973 Japan .................................. 48-68241
June 27, 1973 Japan .................................. 48-71641

[51] Int. Cl.$^2$ ...................... C08G 63/18; C08G 63/70
[52] U.S. Cl. .............................. 260/75 T; 264/210 F; 264/290 T; 264/342 R
[58] Field of Search .................... 260/75 T; 264/290 T

[56] References Cited

U.S. PATENT DOCUMENTS

| | | | |
|---|---|---|---|
| 2,615,784 | 10/1952 | McClellan | 264/290 T |
| 3,293,223 | 12/1966 | Duling | 260/75 R |
| 3,377,319 | 4/1968 | Wiener | 260/75 R |
| 3,706,111 | 12/1972 | Curtain et al. | 264/290 T X |
| 3,816,486 | 6/1974 | Vail | 260/75 T X |

FOREIGN PATENT DOCUMENTS

| | | |
|---|---|---|
| 604,073 | 6/1948 | United Kingdom. |
| 987,013 | 3/1965 | United Kingdom. |

OTHER PUBLICATIONS

Ludewig, Polyester Fibers, Chemistry and Technology, Wiley-Interscience, N. Y. (1964) pp. 275, 247 & 248.

*Primary Examiner*—Howard E. Schain
*Assistant Examiner*—W. C. Danison, Jr.
*Attorney, Agent, or Firm*—Sherman & Shalloway

[57] ABSTRACT

Naphthalate polyester filaments, yarns or fibers consisting essentially of a naphthalate polyester which has an intrinsic viscosity of 0.3 to 3.5 and a softening point of at least 200° C, and in which at least 85 mol% of the total recurring units consist of units of the formula

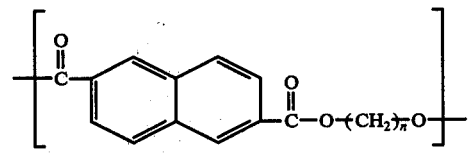

wherein $n$ is 4 or 6, and having at least one diffraction peak at a Bragg scattering angle $2\theta = 16.3° - 16.7°$ and/or $2\theta = 25.3° - 25.8°$ in their X-ray diffraction. These filaments, yarns or fibers are useful especially as an electrically insulating material, an elastomeric reinforcing material, a fluid filter material, a paper-making canvas and a fastener component material.

Of these, filaments, yarns or fibers of poly(tetramethylene 2,6-naphthalate) are prepared by melt-spinning the polymer thereby to form undrawn filaments having a birefringence of at lest 0.01 and a density of not more than 1.300, drawing the undrawn filaments in at least one step at a temperature of at least 60° C. at a total draw ratio of at least 1.8, and then heat-treating the drawn filaments at a temperature higher than the temperature employed in the drawing step and within a range of 100° to 240° C. at constant length, under a restricted shrinkage of not more than 15%, or under a stretch of not more than 15%.

6 Claims, 3 Drawing Figures

POLYTETRAMETHYLENE NAPHTHALATE
(COMPARISON)

POLYHEXAMETHYLENE NAPHTHALATE
(INVENTION)

BRAGG SCATTERING ANGLE (2θ)

NAPHTHALATE POLYESTER FILAMENTS

This is a continuation, of Application Ser. No. 480,819, filed June 19, 1974, now abandoned.

This invention relates to naphthalate polyester filaments, yarns or fibers having superior chemical stability.

In recent years, filaments composed of poly(ethylene-2,6-naphthalate) have been proposed as new polyester fibers. The poly(ethylene-2,6-naphthalate) filaments have superior mechanical characteristics and thermal stability, but their chemical characteristics are not entirely satisfactory. In particular, their use in areas requiring chemical stability, for example, anti-oxidation, wet heat resistance, or chemical resistance, has been limited.

Accordingly, it is an object of this invention to provide naphthalate polyester filaments, yarns or fibers having superior chemical properties along with superior mechanical properties and thermal stability.

The above object of this invention can be achieved in accordance with this invention by naphthalate polyester filaments, yarns or fibers consisting essentially of a naphthalate polyester which has an intrinsic viscosity of 0.3 to 3.5 and a softening point of at least 200° C. and in which at least 89 mol% of the total recurring units consist of units of the following formula

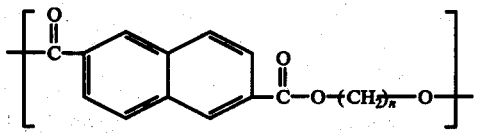

wherein n is 4 or 6, and having at least one diffraction peak at a Bragg Scattering angle $2\theta = 16.3° - 16.7°$, and/or $2\theta = 25.3° - 25.8°$ in their X-ray diffraction.

The naphthalate polyester used in this invention contains tetramethylene-2,6-naphthalate or hexamethylene-2,6-naphthalate units in a proportion of at least 85 mol% of the total recurring units of the polymer.

The naphthalate polyester used in this invention is generally prepared by reacting naphthalene-2,6-dicarboxylic acid and/or its functional derivative with tetramethylene glycol or hexamethylene glycol and/or a functional derivative thereof under suitable conditions. In this reaction, at least one suitable third component can be added in an amount of not more than 15 mol% before completion of the polymerization, thereby to mix or copolymerize it with the naphthalate polymer.

Suitable third components include, for example, dicarboxylic acids such as terephthalic acid, isophthalic acid, 2-methylterephthalic acid, 4-methylisophthalic acid, dichloroterephthalic acid, dibromoterephthalic acid, 5-sodiumsulfoisophthalic acid, naphthalate-2,7-dicarboxylic acid, diphenyldicarboxylic acid, diphenyl ether dicarboxylic acid, diphenylsulfonedicarboxylic acid, diphenoxyethanedicarboxylic acid or sebacic acid, hydroxy acids such as p-β-hydroxyethoxybenzoic acid, functional derivatives of these acids, dihydroxy compounds such as ethylene glycol, diethylene glycol, propylene glycol, trimethylene glycol, hexamethylene glycol (tetramethylene glycol when the glycol component is hexamethylene glycol), decamethylene glycol, neopentylene glycol, cyclohexanedimethylol, hydroquinone, bis(β-hydroxyethoxy)benzene, bisphenol A, bis(p-hydroxyphenyl)sulfone, bis (p-β-hydroxyethoxy phenyl)sulfone, polyoxyethylene glycol, polyoxypropylene glycol, or polyoxytetramethylene glycol, or functional derivatives of these dihydroxy compounds. A compound having at least three ester-forming functional groups, such as glycerine, pentaerythritol, trimethylol propane, trimellitic acid, trimesic acid or pyromellitic acid, can also be incorporated in such quantities as will maintain the polymer substantially linear (that is to say, as will not cause cross-linkage). A monofunctional compound such as benzoic acid or naphthoic acid can also be incorporated in order, for example, to adjust the degree of polymerization of the polymer.

The naphthalate polyester used in this invention may also contain a delusterant such as titanium dioxide, a stabilizer such as phosphoric acid, phosphorous acid, phosphonic acid or an ester of any of these, an ultraviolet absorbent such as a benzophenone derivative or benzotriazole derivative, an anti-oxidant, a lubricant, a pigment or a filler. As the filler, other polymers such as polyethylene terephthalate, poly(ethylene-2,6-naphthalate), polytetramethylene terephthalate can also be used.

The naphthalate polyester filaments, yarns, or fibers of this invention are composed of naphthalate polyesters of relatively high molecular weights, that is, naphthalate polyesters having an intrinsic viscosity of 0.3 to 3.5, preferably 0.35 to 2.0, and a softening point of at least 200° C.

The "intrinsic viscosity", as used in the present application, can be a measure of the degree of polymerization of the polymer, and is a value measured on an o-chlorophenol solution of the polymer at 35° C.

If the intrinsic viscosity of the polyester constituting the filaments, yarns or fibers of this invention is lower than 0.3, the physical properties of the product are deteriorated, and if it is in excess of 3.5, the polymer is difficult to spin.

The "softening point", as used in the present application, is measured as follows: The polymer is heat-treated at 100° C. for 1 hour, and then set in a penetrometer having a plunger with a diameter of 3 mm and a weight of 10.0 g. The temperature is raised at a rate of 6° C./5 minutes from 140° C., and the temperature at which the plunger has penetrated over the distance of 0.5 mm is defined as the softening point of the polymer.

If the softening point of the polymer is lower than 200° C., the thermal stability of the filaments is reduced, and the service temperature of the filaments is lowered.

The filaments of this invention range from those having a monofilament denier of less than 100 to bristles having a monofilament denier of more than 100.

The shape of the cross-section of the filament of this invention is not only a circular shape, but also a non-circular shape such as a triangular, cross or trilobal shape. The filaments may also be hollow filaments.

The filaments, yarns or fibers of this invention have a specific crystalline structure characterized by the fact that in a diffraction intensity distribution curve in the equatorial direction as determined by an X-ray diffraction analysis, they have at least one diffraction peak at a Bragg Scattering angle $2\theta = 16.3°$ to 16.7° and/or $2\theta = 25.3°$ to 25.8°. The above Bragg Scattering angle ($2\theta$) is essentially 16.7 and/or 25.6°, but for various reasons such as influences from a crystal modification having a peak in the vicinity of the peak at $2\theta$, it may fluctuate between 16.3° and 16.7°, and also between 25.3° and 25.8°, as stated above.

Before the present invention, British Pat. No. 987,013 proposed polytetramethylene naphthalate fibers, but these prior art naphthalate fibers are essentially different from the polytetramethylene naphthalate filaments, yarns or fibers of this invention in that the X-ray diffraction intensity distribution curve does not have a peak at a Bragg Scattering angle $2\theta = 16.3° - 16.7°$ or $2\theta = 25.3° - 25.8°$.

The accompanying drawings are graphic representations showing the diffraction intensity distribution curves in the equatorial direction of various poly(tetramethylene 2,6-naphthalate) filaments as determined by an X-ray diffraction analysis.

The X-ray diffraction analysis in this invention was performed using an apparatus (D-9C, the product of Rigaku Denki Kabushiki Kaisha) under the following conditions.

Figure 2:
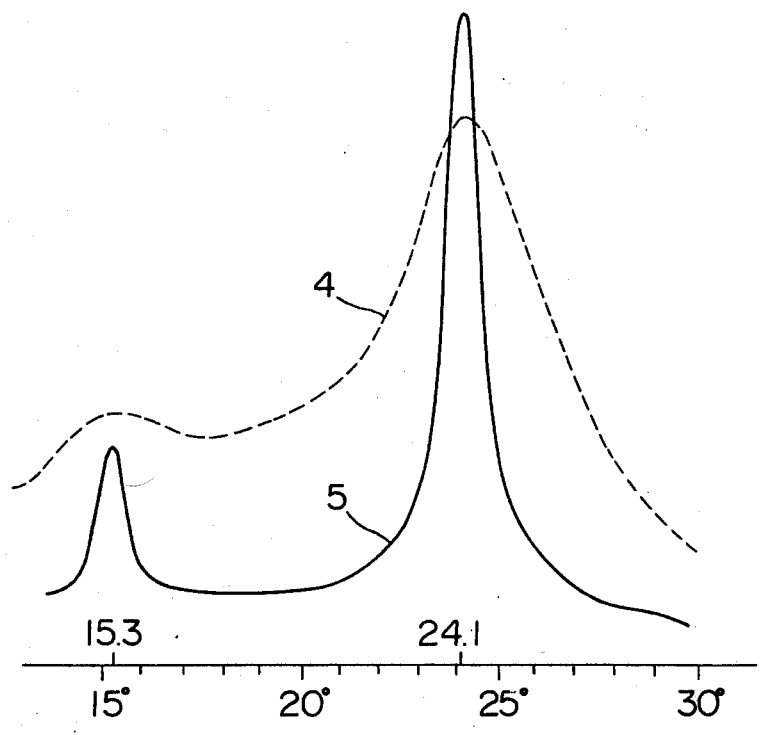

35 KV, 20 mA, nickel filter
Divergence slit diameter: 0.15 mm
Scattering slit: 1°
Receiving slit 0.4 mm,
$\lambda = 1.542$ A FIG. 1 illustrates the diffraction intensity distribution curves of the tetramethylene naphthalate polyester filaments of this invention, the curves 1, 2 and 3 referring to the filaments obtained in the Examples to be given later;

FIG. 2 illustrates the diffraction intensity distribution curve of the poly(tetramethylene-2,6-naphthalate) filaments obtained by the method disclosed in British Pat. No. 987,013; and FIG. 3 illustrates the X-ray diffraction intensity distribution curve (curve 6) of the hexamethylene naphthalate polyester filament of this invention.

As is clear from curve 1 in FIG. 1, the naphthalate polyester filaments of this invention have diffraction peaks at the following three points: $2\theta = 16.7°$, $2\theta = 23.0°$, and $2\theta = 25.6°$, and slight shoulders are observed at $2\theta = 24.1°$ and $2\theta = 15.3°$. Curve 2 shows that the filaments have diffraction peaks at the following four points: $2\theta = 15.3°$, $2\theta = 16.7°$, $2\theta = 24.1°$, and $2\theta = 25.6°$, and at $2\theta = 23.0°$, a shoulder is observed. Curve 3 shows that the filaments have diffraction peaks at the following two points: $2\theta = 16.3° - 16.7°$, and $2\theta = 25.3°$ to $25.8°$. It can thus be seen that all of the filaments have a diffraction peak in at least one of the ranges of $2\theta = 16.3°$ to $16.7°$, and $2\theta = 25.3°$ to $25.8°$.

On the other hand, as shown in FIG. 2, the naphthalate polyester filaments produced by the method disclosed in British Pat. No. 987,013 have diffraction peaks only at the two points: $2\theta = 15.3°$ and $2\theta = 24.1°$, and have no diffraction peaks at $2\theta = 16.3°$ to $16.7°$, and $2\theta = 25.3°$ to $25.8°$.

Figure 3:
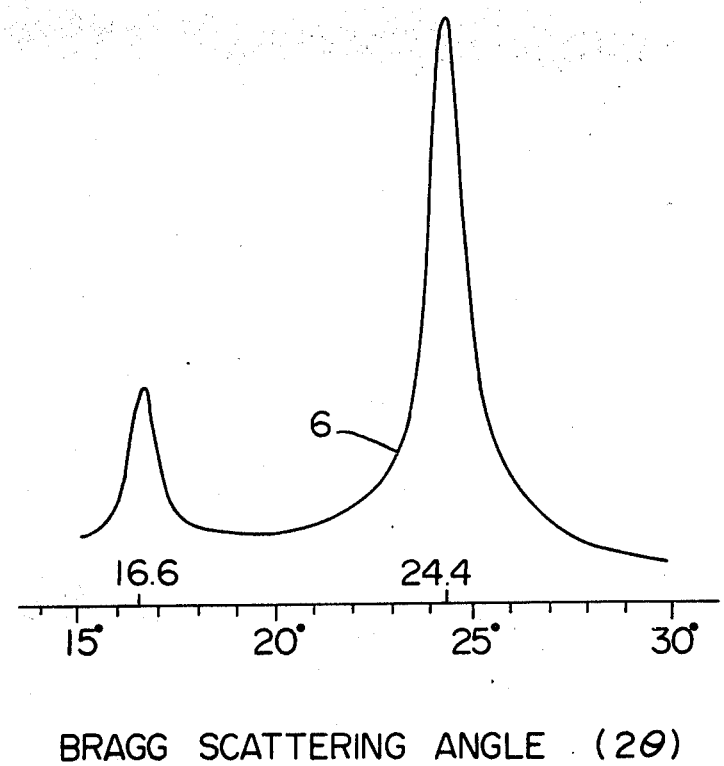

As shown in curve 6 of FIG. 3, hexamethylene naphthalate polyester filaments have diffraction peaks at $2\theta = 16.6°$ and $2\theta = 24.4°$.

Owing to the novel crystal structure as mentioned above, the naphthalate polyester filaments, yarns or fibers of this invention have higher Young's modulus and more superior properties endurable for use at high temperatures for prolonged periods of time than the prior art naphthalate polyester filaments, for example, those described in British Pat. No. 987,013, while retaining sufficient tenacity and break elongation. For example, tetramethylene naphthalate polyester filaments, yarns or fibers having a monofilament denier of less than 100 have a tenacity of at least 4.5 g/de, preferably 4.8 to 8.0 g/d and a Young's modulus of at least 900 Kg/mm², preferably 1000 to 1500 Kg/mm² which are about 50% higher than those of the prior art. Furthermore, these fibers have a tenacity retention of at least 50% after treatment for 96 hours at 200° C, and have superior chemical resistance and resistance to hydrolysis. Accordingly, these fibers are suitable for use as electrically insulating materials of class F, conveyor belt materials or reinforcing materials such as tire cords used at high temperatures, or filters for the chemical industry.

Bristlelike tetramethylene naphthalate polyester filaments of this invention having a monofilament denier of at least 100 have a tensile strength at break of at least 2.5 g/d, preferably at least 2.8 g/d, and a period of at least 10 days is required until the tensile strength at breakage of the filaments decreases to below 1.0 g/d in water kept at 120° C. This is superior to the conventional polyester bristlelike monofilaments composed of polyethylene terephthalate which decrease in their tensile strength at breakage to below 1.0 g/d in 200 hours at the longest.

The bristlelike tetramethylene naphthalate polyester filaments of this invention have good chemical resistance, resistance to hydrolysis, resistance to wet heat and resistance to oxidation. When these bristlelike filaments are allowed to stand in pure water kept at 120° C., the time required until their tensile strength at breakage decreases to 1.0 g/d is at least 10 days, preferably at least 300 hours. These filaments also have a tenacity retention of at least 90% after having been allowed to stand for 2 weeks in the air kept at 170° C. (the conventional bristlelike polyethylene terephthalate monofilaments have a tenacity retention of less than 90%), and a tenacity retention of at least 80% after having been treated with a 20% aqueous solution of sodium hydroxide at 80° C. for 24 hours (the conventional bristlelike polyethylene terephthalate monofilaments have a tenacity retention of 40% at most), and also have a shrinkage in boiling water of not more than 2.0%, preferably not more than 1.5%. Thus, the bristlelike naphthalate polyester filaments of this invention have superior resistance to wet heat, resistance to oxidation, and resistance to alkali hydrolysis. Accordingly, the bristle-like filaments of this invention are suitable for use as a dryer canves in a paper-making process, chemical filter nets, materials of brushes for chemical cleaning materials and reinforcing materials for belts for transporting goods or for power transmission, cable cords, reinforcing materials for blade hoses, or fastener component materials.

The tetramethylene naphthalate polyester filaments (including bristlelike monofilaments), yarns and fibers of this invention can also be used in combination with other filaments, yarns or fibers (for example, polyethylene terephthalate filaments, yarns or fibers, or nylon filaments, yarns or fibers).

The tetramethylene naphthalate polyester filaments, yarns or fibers of this invention as described above can be produced by meltspinning a naphthalate polyester containing at least 85 mol% of tetramethylene-2,6-naphthalate units and having an intrinsic viscosity of 0.3 to 3.5 and a softening point of at least 200° C. to form undrawn filaments having a birefringence of at least 0.01 and a density of not more than 1.300, drawing the filaments at a temperature of at least 60° C., preferably 75 to 220° C. at a total draw ratio of at least 1.8, preferably 2.5 to 7.0 in at least one step, and then heat-treating the drawn filaments at a temperature higher than the drawing temperature and within the range of 100° to 240° C., preferably 150° to 240° C., at constant length or while allowing a restricted shrinkage of not more than 15% or a stretch of not more than 15%.

The drawing can be performed in two or more steps. In this case, it is recommended to perform the first-step drawing at a temperature of 60° to 150° C. and the second-step drawing at a temperature higher than the firststep drawing temperature and within the range of 100° to 220° C., and adjust the total draw ratio to 2.0 - 7.0.

The undrawn filaments can be conveniently obtained by melting the tetramethylene naphthalate polyester used in this invention, and extruding the molten polymer through a spinneret, while heating the atmosphere near the filaments over an area which extends from the underface of the spinnerete to a point at least 10 cm apart from it to a temperature of 200° to 600° C. The resulting undrawn filaments having a birefringence of at least 0.01 and a density of not more than 1.300 have good drawability, and can be drawn smoothly at a temperature of at least 60° C. However, it should be noted that the present invention is not limited to filaments produced by this method.

Heating of the atmosphere below the spinneret in this spinning method can, for example, be accomplished by providing a heated spinning cell, or blowing a heated gas. The heating medium may be air, and in order to prevent the heat-deterioration of the filaments, an inert gas such as $N_2$ or $CO_2$ is effectively used.

In order to obtain undrawn filaments having good drawability, it is necessary to raise the temperature of the atmosphere below the spinneret to more than 200° C. When it is raised to more than 600° C., no special advantage is brought about, and rather there is an increasing danger. Thus, temperatures above this limit are difficult to employ in actual operations.

The spun filaments should be brought into contact with the atmosphere heated at 200° to 600° C. in a zone extending from the underface of the spinneret to a point at least 10 cm apart from it; otherwise, no effect can be obtained. The length of the zone in which the atmosphere is to be heated at 200° to 600° C. is dominated by other spinning conditions. But if the take-up speed does not exceed 600 m/min., the length of 10 cm to 100 cm is sufficient. If, however, the take-up speed is above 600 m/min. or the temperature of the atmosphere is below 300° c., it is sometimes necessary, according to the type of polymer, to heat a zone which runs over a distance of 200 cm from the spinneret.

After passing the spun filaments through such a heated atmosphere, the filaments are cooled and solidified by a conventional method.

The above procedure gives rise to undrawn yarns having a relatively low degree of crystallinity and good drawability in spite of being highly oriented. The degree of crystallinity is measured usually by the density method.

The degree of crystallinity ($\alpha$) according to the density method is defined by the following equation.

$$\alpha = \frac{dk(d - da)}{d(dk - da)} \quad (1)$$

wherein
 $dk$ is the density of the crystalline phase,
 $da$ is the density of the non-crystalline phase, and
 $d$ is the density of a sample.
This equation (1) can be written as:

$$\alpha = K - K'/d$$

wherein
 $K$ and $K'$ are constants.

The density of the non-crystalline phase of tetramethylene naphthalate polyester is difficult to measure since it is difficult to prepare a completely amorphous polymer. Furthermore, the density of complete crystals of this polymer is not known.

However, even if the densities of the complete crystalline or amorphous phases are not known, it could be judged qualitatively that since the degree of crystallinity ($\alpha$) is the function of the density ($d$) of the sample, the degree of crystallinity ($\alpha$) becomes higher if the density ($d$) is higher. Accordingly, in the present invention, the degree of crystallinity is expressed in terms of density.

Preferably, the naphthalate polyester filaments, yarns or fibers of this invention in which the proportion of hexamethylene naphthalate units is at least 85 mol% are highly oriented so that their tenacity is at least 2.5 g/d.

Bristlelike monofilaments each having at least 100 denier and composed of the hexamethylene naphthalate polyester as defined in the present invention have superior resistance to wet heat, and when allowed to stand in pure water at 120° C., they exhibit a tenacity retention time (the time required until the tenacity decreases to 1.0 g/d) of at least 10 days (at the longest 200 hours in the case of the known polyester bristlelike monofilaments composed of polyethylene terephthalate).

The hexamethylene naphthalate polyester filaments, yarns or fibers of this invention having a monofilament denier of less than 100 also exhibit a tenacity retention time in pure water at 120° C., of at least 10 days.

The above hexamethylene naphthalate polyester filaments, yarns or fibers can be prepared by spinning and drawing a polyester containing at least 85 mol% of hexamethylene-2,6-naphthalate units as a starting material in the same way as in the preparation of the known filaments, yarns or fibers. The spun filaments can be rapidly cooled in a liquid kept at not more than 20° C., or they are solidified after being passed at least once through a zone extending over a distance of at least 10 cm from the spinneret and heated at a temperature of 150° to 600° C. Or the spun filaments are solidified in a coagulating bath kept at 50° to 200° C. Thus, undrawn filaments having good drawability can be obtained. Instead of these, the filaments can also be spun directly into the atmospheric air.

The drawing of the filaments may be performed immediately after the spinning step or after the filaments have been wound up. The use of a heating medium such as air, an inert gas, steam, or an inert liquid as heating means is preferred in the drawing step, because this results in good drawing condition, and drawn filaments of uniform properties can be obtained. The drawing can be performed either in a single step or in a multiplicity of steps.

The filaments as drawn have sufficient properties, but their properties can be further improved if they are heat-treated at a temperature higher than the drawing temperature while allowing shrinkage or stretch or at constant length.

The hexamethylene naphthalate polyester filaments, yarns or fibers of this invention have superior chemical resistance, resistance to hydrolysis, resistance to wet heat, and resistance to oxidation to the conventional polyester filaments, yarns or fibers composed of polyethylene terephthalate. They are suitable for use in applications which require these properties, for example, dryer canvas in a paper-making process, filters for chemical liquids, materials of bushes for chemical cleaning, reinforcing belt materials for radial tires or belted bias tires, materials or reinforcing materials for belts used to transport goods or transmit power, cable cords, or reinforcing materials for blade hoses. Furthermore, because of the superior abrasion resistance, they are also useful as fastener component materials.

The following Examples illustrate the present invention in greater detail. In the Examples, the various properties mentioned were measured by the following methods.

Resistance to Wet Heat

This property is expressed in terms of the period of time which is required until the tensile strength at breakage of fibers decreases to 1.0 g/d when the fibers are immersed in pure water kept at 120° C. The larger this value is, the more superior is the wet heat resistance of the fibers.

Resistance to Oxidation

The fibers are exposed to air at 170° C., and after 2 weeks, the tenacity retention over the initial tenacity is determined and expressed in percent.

Resistance to Alkali

This property is expressed by a tenacity retention (%) after a lapse of 24 hours when the fibers are immersed in a 20% aqueous solution of sodium hydroxide at 80° C.

Intrinsic Viscosity

Meausred on an o-chlorophenol solution at 35° C.

Tenacity, Elongation and Young's Modulus

A tensile test was performed at a tensile speed of 100%/min. using a sample having a length of 20 cm. The tenacity is expressed by a value per denier of the sample before tensile test.

Shrinkage in Boiling Water

The sample filament is immersed in boiling water at 100° C. in a free state for 30 minutes. The shrinkage of the filament is expressed in percent based on the length before treatment.

Thermal Stability Test

The sample filament is treated in an air bath at 200° C. for 96 hours in a free state. The tenacity retention of the filament is then measured. Filaments having a tenacity retention of at least 50% are evaluated as serviceable.

EXAMPLES 1 TO 5 AND COMPARATIVE EXAMPLE 1

Poly(tetramethylene-2,6-naphthalate) having an intrinsic viscosity of 0.86 was melt-spun at a spinning temperature of 280° C from a spinneret having 12 circular orifices with a diameter of 0.5 mm, and taken up at a rate of 360 m/min. At this time, an area extending over a distance of 100 cm from the underface of the spinneret was heated at 400° C. The spun filaments were passed through this heated atmosphere, and taken up.

Each of the undrawn filaments was wound through one turn around a pin at the various temperatures shown in Table 1, and then heat-set on a plate at various temperatures. The properties of the resulting filaments are shown in Table 1. The resulting filaments had an intrinsic viscosity of 0.81.

For comparison, the properties of poly(tetramethylene-2,6-naphthalate) filaments produced by the method disclosed in Example 9 of British Pat. No. 987,013 are also shown in Table 1.

Table 1

| Examples | Temperature of pin (° C) | Draw ratio (TDR) | Temperature of plate (° C) | X-ray diffraction intensity curve* | Tenacity (g/d) | Elongation (%) | Young's modulus (kg/mm²) | Denier Size (per monofilament) | Thermal Stability test |
|---|---|---|---|---|---|---|---|---|---|
| 1 | 75 | 3.1 | 150 (constant length) | 1 | 5.0 | 9.5 | 1250 | 5.4 | Serviceable |
| 2 | 100 | 3.4 | 150 (5% stretch) | 2 | 6.4 | 8.2 | 1340 | 4.9 | " |
| 3 | 125 | 2.8 | 150 (5% shrinkage) | 1 | 5.6 | 10.6 | 1100 | 6.0 | " |
| 4 | 175 | 3.0 | 220 (constant length) | 2 | 5.5 | 13.9 | 1000 | 5.6 | " |
| 5 | 90 | 4.8 | 180 (constant length) | 1 | 5.2 | 11.4 | 980 | 3.5 | " |
| Comparative Examples 1 | 90 | 1.5 | 185 | 5 | 4.2 | 10.0 | 750 | 2.6 | Not Serviceable. |

*The numerals indicate the numbers attached to the curves in FIGS. 1 and 2.

EXAMPLE 6

Poly(tetramethylene-2,6-naphthalate) having an intrinsic viscosity of 1.2 was spun at 285° C., and taken up at a rate of 750 m/min. The X-ray diffraction intensity distribution of the undrawn filaments obtained was similar to curve 4 in FIG. 2. The filaments had an intrinsic viscosity of 1.02, a monofilament denier of 8.0, a tenacity of 3.6 g/d and an elongation of 15.2%, but a Young's modulus of 620 Kg/mm² (comparison).

The undrawn filaments obtained were drawn to 1.3 times their original length by a pin kept at 100° C., and heat set at 180° C. The X-ray diffraction intensity distribution curve of the resulting drawn filaments was similar to that of curve 5 or FIG. 2. The drawn filaments had a monofilament denier of 6.2, a tenacity of 3.9 g/d, an elongation of 12.5% and a Young's modulus of 750 kg/mm². The drawn filments were found to be unserviceable by the thermal stability test (comparison).

When the above undrawn filaments were drawn to 2.4 times their original length by a pin kept at 150° C., and then heat treated at 200° C., the X-ray diffraction intensity distribution curve of the filaments became curve 1 of FIG. 1. The drawn filaments had a monofilament denier of 3.3, a tenacity of 5.3 g/d, an elongation of 12.9% and a Young's modulus of 1000 kg/mm², and were found to be serviceable by the thermal stability test.

EXAMPLE 7

The same undrawn filaments as in Example 1 were wound through five turns around a feed roller with a diameter of 90 mm heated at 50° C., and then drawn to 3.1 times their original length, and successively heat treated at constant length at 200° C. The X-ray diffraction intensity distribution curve of the resulting filaments was similar to curve 2 in FIG. 1. The filaments had a monofilament denier of 5.4, a tenacity of 5.3 g/d, an elongation of 15.9% and a Young's modulus of 1070 kg/mm², and were found to be serviceable by the thermal stability test.

When the filaments were wound through 5 turns around a heated feed roller with a diameter of 90 mm at a temperature of 175° C., and drawn, they could be drawn only to 1.4 times their original length, and even when they were heat-set at 220° C., the X-ray diffraction intensity distribution curve of the filaments was similar to curve 5 in FIG. 2. The drawn filaments had a monofilament denier of 12, a tenacity of 2.3 g/d, an elongation of 46.2% and a Young's modulus of 550 kg/mm², and were found to be not serviceable by the thermal stability test (comparison).

EXAMPLE 8

Poly(tetramethylene 2,6-naphthalate) having an intrinsic viscosity of 0.95 was spun at 280° C., and wound up at a rate of 360 m/min. The undrawn filaments (with an intrinsic viscosity of 0.91) were drawn to 2.5 times their original length by a pin kept at 90° C., and wound up without heat-setting. The X-ray diffraction intensity distribution curve of these filaments was similar to curve 3 of FIG. 1. The drawn filaments had a monofilament denier of 6.7, a tenacity of 4.6 g/d, an elongation of 6%, and a Young's modulus of 900 kg/mm², and were found to be serviceable by the thermal stability test.

EXAMPLES 9 AND 10 AND COMPARATIVE EXAMPLE 2

Poly(tetramethylene-2,6-naphthalate) having various intrinsic viscosities as shown in Table 2 was heated at 280° C., and extruded into the air through a spinneret having one spinning orifice of a complete circular shape. The filament was immediately led into water kept at 20° C. to cool and solidify it. Successively, it was drawn at the draw ratio shown in Table 2 in a bath of ethylene glycol kept at 70° C. and heat-treated at 175° C. at constant length to form a bristlelike filament having a denier of 2100 to 2600. The properties of the bristlelike filaments were measured, and the results are shown in Table 2.

Table 2

| Runs | $[\eta]$ of naphthalate polymer | Intrinsic viscosity of filaments as extruded | Draw ratio | Normal tenacity (g/d) | Normal elongation (%) | Knot strength (g/d) | Wet heat resistance (days) | Alkali resistance (%) | X-ray diffraction intensity curve | Shrinkage in boiling water (%) |
|---|---|---|---|---|---|---|---|---|---|---|
| Example 9 | 0.89 | 0.83 | 4.8 | 4.3 | 28 | 3.2 | 24 | 93 | 2 | 0.7 |
| Example 10 | 0.58 | 0.54 | 6.2 | 5.8 | 23 | 3.5 | 32 | 91 | 2 | 1.3 |
| Comparative Example 2 | 0.28 | 0.25 | 5.0 | 5.1 | 5.3 | 1.0 | 10 | 85 | 2 | 1.1 |

A paper-making canvas was prepared by weaving the bristlelike filaments obtained in each of Examples 9 and 10, and used continuously for two months in a wet heat zone in a process of producing good quality paper. No abnormal phenomenon occurred, and the operability of the canvas was stable.

EXAMPLE 11

Poly(tetramethylene-2,6-naphthalate) having an intrinsic viscosity of 0.86 was melted at 280° C. and then extruded into the air through a spinneret having one spinning orifice of complete circular shape. Immediately then, the filament was led into water kept at 0° C. to quench and solidify it. The solidified filament was wound up, then drawn at a ratio of 4.6 in a bath of ethylene glycol kept at 70° C. and heat-treated at 180° C. at constant length to form a bristlelike filament having an intrinsic viscosity of 0.81 and a denier size of 610. The X-ray diffraction intensity distribution curve of this filament was the same as curve 2 of FIG. 1.

The properties of this bristlelike filament and those of a commercially available polyethylene terephthalate bristle (T-PRN of Hoechst AG, 600 denier) were measured, and the results are shown in Table 3.

Table 3

|  | Present invention | Commercially available bristle |
|---|---|---|
| Normal strength (g/d) | 5.9 | 4.3 |
| Normal elongation (%) | 21 | 49 |
| Knot strength (g/d) | 3.5 | 3.7 |
| Knot elongation (%) | 12 | 30 |
| Wet heat resistance (days) | 30 | 8 |
| Resistance to oxidation (%) | 100 | 88 |
| Alkali resistance (%) | 92 | 40 |
| Shrinkage in boiling water (%) | 1.0 | 2.4 |

A paper-making canvas was produced in the same way as in Example 9 using each of the bristles shown above. No abnormal phenomenon was seen in the canvas produced from the bristle of this invention after continuous use for 2 months, whereas in the canvas produced from the commercially available bristles, several bristles were seen to break on the 20th day.

EXAMPLES 12 TO 15

Bristles of various normal tenacities and elongations and knot strengths and elongations were prepared under the same conditions as in Example 11 except that the drawing conditions were varied as indicated in Table 4. The wet heat resistance of each of the bristles was measured. The results are shown in Table 4.

Table 4

|  | Examples | | | 15 (comparison) |
|---|---|---|---|---|
|  | 12 | 13 | 14 | |
| Normal strength (g/d) | 6.3 | 3.6 | 2.9 | 2.4 |
| Normal elongation (%) | 41 | 31 | 38 | 46 |
| Knot strength (g/d) | 3.8 | 2.9 | 2.5 | 1.9 |
| Knot elongation (%) | 28 | 39 | 32 | 36 |
| Wet heat resistance (days) | 45 | 20 | 15 | 7 |
| Drawing temperature (° C) | 90/120* | 90 | 90 | 90 |
| Draw ratio | 6.3 | 3.2 | 2.5 | 1.8 |
| Denier size (denier) | 450 | 860 | 1200 | 1500 |
| X-ray diffraction intensity distribution curve | 1 | 2 | 2 | 4 |

*Drawing was done in two steps. The draw ratio was 4.2 in the first step, and 1.5 in the second step.

A rubber belt for transporting goods was produced using the bristlelike filament of Example 12 as a reinforcing material, and used for conveying wet tows in the step of drying crimped polyester tows. After 20 days' continuous operation, no trouble occurred.

EXAMPLE 16

Poly(tetramethylene-2,6-naphthalate) having an intrinsic viscosity of 0.92 was melted at 280° C., and spun through a spinneret having one spinning orifice. The atmosphere in a zone extending over a distance of 100 cm below the spinneret was heated at 450° C. by means of a heated cell. The spun filament was passed through this zone, and then cooled and solidified in the air.

The resulting undrawn filaments (with an intrinsic viscosity of 0.87) were wound around a heated feed roller at 50° C. and drawn at a ratio of 3.9, followed by heat-treatment at 180° C. to form a bristle having a size of 1000 denier.

The resulting bristle had a normal tenacity of 4.2 g/d and exhibited a wet heat resistance of 28 days. Also, this bristle showed an X-ray diffraction intensity distribution curve similar to curve 2 of FIG. 1. When this bristle was immersed for 24 hours in sulfuric acid, no change was seen. The bristle had a shrinkage in boiling water of 0.6%.

EXAMPLES 17 AND 18 AND COMPARATIVE EXAMPLE 3

Poly(tetramethylene-2,6-naphthalate) having an intrinsic viscosity of 0.88 was extruded at a spinning temperature of 280° C. using a spinneret with 12 orifices each having a diameter of 0.5 mm and a length of 0.9 mm at an extrusion rate of 8.0 g/min. The extruded filaments were wound up at a rate of 360 m/min. At this time, a heated spinning cell was provided in a region extending from 1 cm immediately below the spinneret to 100 cm below it so that the temperature of the yarn path was maintained at 250° C. (Example 17) and 400° C. (Example 18), respectively. The birefringence and density of the resulting undrawn filaments, and the maximum draw ratio at the time of drawing on a hot pin kept at 100° C. are shown in Table 5. For comparison, the above procedure was repeated except that the heated spinning cell was not provided. The results are also shown in Table 5.

Table 5

|  | Temperature of the atmosphere (° C) | Birefringence | Density (g/dm³) | Maximum draw ratio |
|---|---|---|---|---|
| Example 17 | 250 | 0.236 | 1.2980 | 3.72 |
| Example 18 | 400 | 0.226 | 1.2975 | 4.10 |
| Comparative Example 3 | * | 0.258 | 1.3015 | 2.70 |

*The temperature at a point 0.5 cm below the spinneret was 185° C.

When the atmosphere below the spinneret was heated to 250°–400° C. in Examples 17 and 18, the birefringence of the filaments exceeded 0.22 which is about 100 times as high as that of an ordinary polyester. Since, however, the density (therefore, degree of crystallinity) of the filaments was low, the maximum draw ratio was higher than in the case of not heating the atmosphere below the spinneret, and undrawn filaments of good quality were obtained.

EXAMPLE 19 AND COMPARATIVE EXAMPLE 4

Poly(tetramethylene-2,6-naphthalate) having an intrinsic viscosity of 0.64 and having copolymerized therewith 2 mol% of terephthalic acid was spun under the same conditions as in Eample 17. The spinning temperature was 285° C., and instead of providing a heated spinning cell, air heated at 300° C. was fed at a speed of 3 meters per second to a region measuring 80 cm in length. The filaments were wound up at a rate of 500 m/min. The resulting filaments had a birefringence of 0.240, a density of 1.2985, and a maximum draw ratio at 100° C. of 3.25.

When heated air was not blown in the above procedure for the sake of comparison, the temperature of the atmosphere at a point 0.5 cm below the spinneret was about 185° C. At a take-up speed of 500 m/min., the filaments broke and could not be wound up.

EXAMPLE 20

Poly(hexamethylene-2,6-naphthalate) having an intrinsic viscosity of 0.92 was melted at 255° C., and then extruded through a spinneret having one spinning orifice of a complete circular shape. The spun filaments were quenched and solidified in ice water, and successively drawn to 5.2 times their original length in a bath of ethylene glycol kept at 50° C. The spun filaments had an intrinsic viscosity of 0.88.

The properties of resulting bristlelike filaments are shown in Table 6 together with those of commercially available polyethylene terephthalate bristles (T-PRN, the product of Hoechst AG).

Table 6

|  | Invention | Commercially available bristles |
|---|---|---|
| Denier size (denier) | 570 | 600 |
| Normal tenacity (g/de) | 4.8 | 4.3 |
| Normal elongation (%) | 24 | 49 |
| Knot strength (g/de) | 2.8 | 3.7 |
| Knot elongation (%) | 15 | 30 |
| Wet heat resistance (days) | 24 | 8 |
| Resistance to oxidation (%) | 100 | 88 |
| Resistance to hydrolysis (%) | 93 | 40 |
| X-ray diffraction intensity curve | Curve 6 of Figure 3 | — |

EXAMPLE 21

Bristlelike filaments were prepared in the same way as in Example 20 except that the drawing conditions were varied as shown in Table 7. The tenacity, elongation, and wet heat resistance of the resulting filaments are shown in Table 7.

Table 7

| Run No. | 1 | 2 | 3 |
|---|---|---|---|
| Denier size (denier) | 420 | 580 | 630 |
| Normal tenacity (g/de) | 5.2 | 3.8 | 2.5 |
| Normal elongation (%) | 22 | 32 | 35 |
| Knot strength (g/de) | 3.8 | 3.0 | 2.1 |
| Knot elongation (%) | 16 | 22 | 27 |
| Wet heat resistance (days) | 32 | 20 | 9 |
| X-ray diffraction intensity curve | Curve 6 | Curve 6 | Curve 6 |

EXAMPLE 22

Poly(hexamethylene-2,6-naphthalate) having an intrinsic viscosity of 0.75 was melted at 250° C. and spun using a spinneret having one spinning orifice. At this time, a heated spinning cell was provided over a region extending from immediately below the spinneret to a point 300 cm below it, and the filament was passed through the atmosphere within this region kept at 300° C., and then cooled and solidified. The filament as spun had an intrinsic viscosity of 0.72.

The undrawn filament was wound through 8 turns around a roller heated at 40° C., and then drawn to 3.8 times their original length. The resulting bristlelike filament had a denier size of 470 denier, a normal tenacity of 4.1 g/de and a knot strength of 3.1 g/de. The bristlelike filament had a wet heat resistance of 30 days, which indicates superior wet heat resistance.

The X-ray diffraction intensity curve of this bristlelike filament was the same as that of curve 6.

EXAMPLE 23

Poly(tetramethylene-2,6-naphthalate) was melt-spun at 280° C. through a spinneret having 48 circular orifices with a diameter of 0.5 mm to form poly(tetramethylene-2,6-naphthalate) filaments. The undrawn filaments obtained were drawn to 2.6 times the original length by a pin kept at 150° C., and heat-set at 180° C. The properties of the filaments had the properties as shown in Table 8.

These yarns were twisted, sized by means of rollers, and denoted to form a warp yarn. On the other hand, a weft yarn was obtained by the steps of bobbin take-up, Italian throwing and pirn winding. Using these yarns, a woven cloth with a width of 101 cm was prepared. The density of the warp and weft at this time was 72 × 31/inch. The cloth was boiled in loop in hot water kept at 90° to 100° C. to reduce the content of the adhering size to less than 0.2%, and then dried by means of rollers at a temperature of 115° C. Then, the cloth was passed through a pin tenter having a length of 1.5 m at a rate of 20 m/min. at a temperature of 220° C. under tension (degree of tension 1.01) to heat-treat the fabric. At this time, the density of the warp and weft was 74 × 32.5/inch. The properties of the cloth are shown in Table 8.

Table 8

| Properties of the filaments | |
|---|---|
| Tenacity (g/de) | 5.50 |
| Elongation (%) | 14.0 |
| Young's modulus (kg/mm$^2$) | 1300 |
| Shrinkage in boiling water (%) | 2.5 |
| Shrinkage in dry heat at 180° C. (%) | 3.9 |
| X-ray diffraction intensity curve (Curve 1 of Figure 1) | |
| Properties of the woven cloth | |
| Tensile strength (kg/mm$^2$) | 850 (warp) |
|  | 800 (weft) |
| Tensile elongation (%) | 15 (warp) |
|  | 18 (weft) |
| Tensile elasticity (kg/cm$^2$ × 10$^2$) | 15 (warp) |
|  | 13 (weft) |
| Elemendorf tear strength (kg) | above 1.1 (warp) |
|  | above 1.5 (weft) |

The heat-treated cloth so obtained was impregnated with a varnish composed of a copolymer of methylphenyl siloxane and alkyd (the so-called alkyd-modified silicone varnish), dried at 120° C. for 5 minutes, and further baked at 200° C. for 25 minutes. The amount of varnish impregnated was 2.6 times the amount of the cloth. The properties of the varnish-impregnated cloth were measured. Furthermore, the varnish-impregnated cloth was deteriorated for 1 week in hot air at 200° C., and then its properties were measured. The results are shown in Table 9. It is seen from the results that the cloth obtained is useful as an electrically insulating material having superior thermal stability.

Table 9

| Properties | Initial value | Value after deterioration for 7 days at 200° C. |
|---|---|---|
| Tensile strength (kg/cm$^2$) (15 cm width) | 630 | 400 |
| Tensile elongation (%) (15 cm width) | 13 | 9.5 |
| Schopper bending resistance(cycles) | >10$^3$ | 900 |
| Mullen bursting strength (kg/cm$^2$) | > 8 | 6 |
| Volume resistivity (ohms-cm) | 3 × 10$^{15}$ | 3 × 10$^{15}$ |
| Dielectric breakdown voltage (KV/mm) | 50 | 48 |

EXAMPLES 24 AND 25 AND COMPARATIVE EXAMPLE 5

Cords of the structures indicated in Table 10 were produced using poly(tetramethylene-2,6-naphthalate) filaments having an intrinsic viscosity of 0.80, a tenacity of 6.8 g/de, a Young's modulus of 1700 kg/mm$^2$, and the same X-ray diffraction intensity curve as curve 1 in FIG. 1 (to be abbreviated to C$_4$N) and poly(hexamethylene-2,6-naphthalate) filaments having an intrinsic viscosity of 0.75, a tenacity of 5.7 g/de, a Young's modulus of 1300 kg/mm$^2$ and the same X-ray diffraction intensity curve as curve 6 of FIG. 3 (to be abbreviated to C$_6$N). V-belts were produced using the resulting cords as a reinforcing material. Using the belts obtained, an operating test was conducted under the following conditions:

| | |
|---|---|
| Outside diameter of pulley | 60 mm |
| Number of rotation | 3600 rpm |
| Load | 50 kg |

For comparison, V-belts were prepared in the same manner as above using rayon and polyethylene terephthalate (PET) filaments, and an operating test was conducted under the same conditions. The results are shown in table 10.

Table 10

|  | Example 24 | Example 25 | Comparative Example 5 | |
|---|---|---|---|---|
| Material | C₄N | C₆H | Rayon | PET |
| Denier/number of filaments | 1000/3/3 | 1000/3/3 | 1100/2/5 | 1000/3/3 |
| Number of twists (T/10 cm; Z × S) | 10 × 15 | 10 × 15 | 10 × 27 | 10 × 15 |
| Tenacity of belt (kg) | 440 | 400 | 310 | 430 |
| Tenacity retention of belt (%) | 97 | 98 | 85 | 75 |
| Elongation during running (%) | 0.28 | 0.35 | 0.60 | 1.52 |
| Durability (index) | 170 | 180 | 100 | 130 |

The tenacity retention was calculated from the value measured after 72 hours. The elongation during running was calculated from the value measured after 24 hours. The index of durability was calculated on the basis that the durability of the rayon cord is 100.

It is seen from the above results that the belts reinforced with the polytetramethylene naphthalate and polyhexamethylene naphthalate cords in accordance with this invention have very high tenacity retention, low elongation during running, and superior dimensional stability. It is thought that these properties are due to the reduced heat build-up during running and good thermal stability and wet heat resistance of the cords.

EXAMPLES 26 AND 27

Tire fabrics were produced using cords of each of the yarns having the properties shown in Table 11. Using the tire fabrics as a carcass reinforcing material and a rayon cord as a belt-like reinforcing material, radial tires were built.

Table 11

|  | Example 26 (C₄H) | Example 27 (C₆N) |
|---|---|---|
| Intrinsic viscosity of the yarn | 0.91 | 0.82 |
| Total denier (de) | 1020 de/ 192 fil | 1010 de/ 192 fil |
| Tenacity (g/de) | 7.60 | 5.05 |
| Elongation (%) | 6.7 | 8.9 |
| Young's modulus (kg/mm²) | 1710 | 1200 |
| Shrinkage in boiling water (%) | 2.7 | 2.5 |
| Shrinkage in dry heat at 180° C (%) | 5.9 | 4.8 |
| X-ray diffraction intensity curve | 1 | 6 |

The cord for the carcass reinforcing material consisted of two of the above yarn in a two ply construction. The twists was 40$^S$ × 40$^Z$ T/10 cm, and the number of cords (the density of the warp in the fabric) was 50/5 cm. The rayon cord used as the belt-like reinforcing material had a size of 1650 de/3 fil. The number of twists was 30$^S$ × 30$^Z$ T/10 cm, and the number of cords was 35/5 cm. It was of a four ply construction. The size of the tire used was 165 SR 13. The belt-like reinforcing material was disposed at an angle of about 15° with respect to the circumferential direction of the tire, and the cord as a carcass reinforcing material was placed at an angle of 90° with respect to the circumferential direction. The properties of the resulting radial tires are shown in Table 12.

Table 12

| Tire No. | Yarn of carcass material | Properties of the cords | | Properties of the tires | |
|---|---|---|---|---|---|
|  |  | Dry heat shrinkage | Disc fatigue | Durability | Uniformity |
| 1 | C₄N | 1.8 | 80 | Good | 75 |
| 2 | C₆N | 2.0 | 82 | Good | 85 |

The evaluation of the properties of the above cords and tires was made by the following procedures.

1. Dry heat shrinkage of the cord: Shrinkage (%) of the cord after it has been exposed to dry air at 150° C. for 30 minutes while allowing it to shrink freely.

2. Disc fatigue: The fatigue strength of the cord is measured by the method defined in JIS L1017 1963. The amount of distortion is expressed by tenacity residue ratio [tenacity after fatigue × 100/tenacity before fatigue (%)] after fatigue for 24 hours under the following conditions: extension/compression 7.5%/15%, bend angle 75°, speed of rotation 1800 rpm.

3. Durability: The tire was driven on a drum at a speed of 80 km/hour under a load of 410 kg. The pressure of the air in the tire is 1.9 kg/cm². When it runs more than 20,000 km without trouble, the evaluation is given as "good", and when it cannot run more than 20,000 Km without trouble, the evaluation is "bad".

4. Uniformity: The tire is rotated, and the non-uniformity of the tire in the radical direction is detected by the bias of the force (kg) (radial force variation). Smaller values (RFV values) show better uniformity. In the table, the numerals for uniformity are indices on the basis that the RFV value of a polyethylene terephthalate carcass tire is 100.

EXAMPLE 28

Poly(tetramethylene-2,6-naphthalate) having an intrinsic viscosity of 0.72 was melt-spun at 280° C. using a spinneret having one orifice with a diameter of 1.5 mm and an L/D ratio of 1.0. The resulting filament was drawn to about 4 times its original length at 75° C., and heat-set at 180° C. During the filament-making process, no odoriferous gas was evolved. The resulting monofilament had 2450 denier, a tenacity of 3.9 g/d, and elongation of 25%, and a shrinkage in boiling water of 0.9%. The monofilament exhibited the same X-ray diffraction intensity curve as curve 2 of FIG. 1.

An L-shaped fastener was produced from this monofilament using a traverse-equipped disc heated at 100° to 120° C. There was scarcely any shrinkage of the monofilament during this operation, and no trouble occurred.

A sliding tab of the zipper was moved up and down and even after 10,000 cycles, all twenty samples could still be used.

EXAMPLE 29

Poly(tetramethylene-2,6-naphthalate) was melt-spun at 280° C. using a spinneret having 48 holes each with a diameter of 0.5 mm and a circular cross section to form filaments having an intrinsic viscosity of 0.88. The undrawn filaments were drawn to 2.6 times their original length by means of a pin at 150° C., and heat-set at 180° C. Three kinds of drawn filaments having the properties shown in Table 13 were obtained. The X-ray diffraction intensity curve of these filaments was the same as curve 1 of FIG. 1. The chemical properties of these filaments were determined, and the results are shown in Table 13.

Table 13

| Properties of the filaments | | | Chemical properties | | |
| --- | --- | --- | --- | --- | --- |
| Tenacity (g/d) | Elongation (%) | Young's modulus (kg/mm²) | Wet heat resistance (days) | Alkali resistance (%) | Acid resistance (%) |
| 5.50 | 14.0 | 1300 | 30 | 95 | 92 |

A plain weave fabric was produced from these filaments with a warp and weft density of 75 × 35/inch. It was heat-cut in the shape of a circle having a diameter of 30 cm to form a filter.

A slurry of terephthalic acid having a pH of 1.2 which had been precipitated with hydrochloric acid was heated to 80° C. and filtered by means of the filter many times. Each time, the filtration was performed for 24 hours, and after it, the filter was washed before using it next time. After 20 repeated cycles of filtration, the filter was still in good condition.

What we claim is:

1. Naphthalate polyester fiber consisting essentially of a naphthalate polyester which has an intrinsic viscosity of 0.3 to 3.5 and in which at least 85 mol% of the total recurring units consist of units of the formula

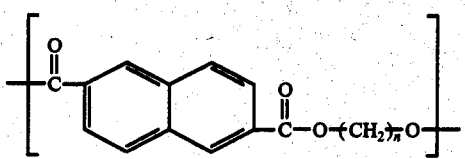

wherein $n$ is 4, and up to 15 mol% of the total recurring units consist of units of mono-, di-tri, or tetrafunctional monomers copolymerizable there-with and having at least one diffraction peak at a Bragg scattering angle $2\theta = 16.3° - 16.7°$ in its X-ray diffraction, said fiber having a tenacity of from about 2.5 g/de to about 8.0 g/de.

2. The naphthalate polyester fiber of claim 1 which has a monofilament denier of from about 1 to about 100, a tenacity of from about 900 kg/mm² to about 1710 kg/mm², and a tenacity retention, after heat-treatment for 96 hours at 200° C., of from about 50% to about 100%.

3. The naphthalate polyester fiber of claim 1 which has a shrinkage in boiling water of not more than 2.0%.

4. The naphthalate polyester fiber of claim 1 which has a monofilament denier of more than 100 and a tenacity retention time in pure water at 120° C. of at least 10 days.

5. The naphtahlate polyester fiber of claim 1 which has a monofilament denier of from about 1 to about 100 denier, and a tenacity retention time in pure water at 120° C. of at least 10 days.

6. The naphthalate polyester fiber of claim 1 which has a diffraction peak at a Bragg scattering angle $2\theta = 25.3°-25.8°$ in its X-ray diffraction.

* * * * *